United States Patent [19]
Matsui

[11] Patent Number: 5,201,265
[45] Date of Patent: Apr. 13, 1993

[54] APPARATUS FOR PREPARATION OF SUSHI RICE

[75] Inventor: Shokichi Matsui, Asahikawa, Japan

[73] Assignee: Kabushiki Kaisha Kyokuo, Hokkaido, Japan

[21] Appl. No.: 844,048

[22] Filed: Mar. 2, 1992

Related U.S. Application Data

[63] Continuation-in-part of Ser. No. 541,856, Jun. 21, 1990, abandoned.

[30] Foreign Application Priority Data

Jun. 22, 1989 [JP] Japan ............... 1-158204

[51] Int. Cl.$^5$ ............... A23B 4/03; B01F 13/02; B01F 15/06
[52] U.S. Cl. ............... 99/476; 99/517; 366/105; 366/144; 366/228
[58] Field of Search ............... 34/133 D, 133 J, 133 P; 68/19.2, 20; 99/471, 473, 483, 476, 517; 366/101, 105, 144, 219, 220, 225, 226, 228, 229, 233, 22, 25

[56] References Cited

U.S. PATENT DOCUMENTS

| 41,871 | 7/1871 | Ager | 99/517 |
|---|---|---|---|
| 340,466 | 4/1886 | Kniffler | 366/228 |
| 1,111,460 | 9/1914 | Holman | 34/133 D |
| 1,696,172 | 12/1928 | Morrison | 34/133 J |
| 2,537,379 | 1/1951 | Teeman | 34/133 D |
| 2,952,452 | 9/1960 | Kopf | 99/473 |
| 2,968,472 | 1/1961 | Barnett | 366/144 |
| 3,132,846 | 5/1964 | Siddall | 366/105 |
| 3,599,346 | 8/1971 | Quesnel | 366/233 |
| 3,617,030 | 11/1971 | Tironi | 366/105 |
| 4,421,018 | 12/1983 | Pryputsch | 99/473 |
| 4,941,333 | 7/1990 | Blessing | 68/19.2 |

FOREIGN PATENT DOCUMENTS

| 3128570 | 7/1981 | Fed. Rep. of Germany | 99/473 |
|---|---|---|---|
| 202725 | 3/1984 | Japan | 366/228 |
| 241922 | 5/1984 | Japan | 366/228 |
| 2060544 | 8/1988 | Japan | 366/220 |

*Primary Examiner*—Philip R. Coe
*Assistant Examiner*—Terrence R. Till
*Attorney, Agent, or Firm*—Armstrong, Westerman, Hattori, McLeland & Naughton

[57] ABSTRACT

Apparatus for preparing Sushi rice, and discharging opening provided at one end thereof, which is openably closed by a lid having a ventilation opening formed in a central portion thereof, the rotatable container being rotatable about a lateral axis of rotation and having a laterally extending partition plate mounted therein, and an air-blowing fan disposed with a space from the ventilation opening so that the ventilation opening can function as an inlet opening and also as an outlet opening for air.

20 Claims, 9 Drawing Sheets

APPARATUS FOR PREPARATION OF SUSHI RICE

This is a continuation-in-part application of U.S. patent application Ser. No. 541,956, filed Jun. 21, 1990, abandoned.

BACKGROUND OF THE INVENTION

The present invention relates to an apparatus for processing granular foodstuffs such as boiled rice in particular for seasoning, flavoring or the like. More specifically, the invention relates to an apparatus for preparing vinegared boiled-rice, a main foodstuff of the Japanese cuisine widely known as Sushi, at a high preparation efficiency utilizing power. In the apparatus, a seasoning additive comprising such as a vinegar, sugar and a natural or chemical seasoning is added to boiled rice hot from boiling, and then the apparatus can mix the boiled rice and the additive together homogeneously and rapidly to prepare a desirable boiled and vinegared rice.

In preparing boiled and vinegared rice which is often called Shari in Sushi shops and among Sushi-goers, it is necessary to homogeneously apply or coat a seasoning mix or additive mainly comprising a vinegar and containing such as sugar, salt and a chemical seasoning substance on grain surfaces of boiled rice, hot from boiling. For avoiding complexity in description, the boiled rice treated as above will hereinafter be referred to as Sushi rice. In the preparation of the Sushi rice, it becomes important to know how to carry out the vinegaring of boiled rice within a short period of time while the rice is still in a softened condition soon after boiling and in a manner of not allowing grains of the boiled rice to become crushed or to be made a dumpling or doughboy. Whether or not a satisfactory vinegaring of boiled rice can be done greatly depends on a skill which one can gain only after years of experience and it constitutes an important factor greatly influential upon the taste of resulting Sushi food. The seasoning mix or additive with which boiled rice is treated contains other substances than a vinegar, such as sugar, salt and a seasoning material as above, but "vinegaring" of boiled rice as termed in the above and will be termed also elsewhere in this specification because generally in the cases of Sushi rice, a greater emphasis is placed on "vinegaring" than on "seasoning". Also, while "boiled" rice as termed throughout this specification, it should be understood that Sushi rice can be made also of "steamed" rice: For example, while in household preparations of Sushi rice, mostly boiled rice is used, in the cases of an industrial-scale preparation as made at such as large-scale Sushi shops and other suppliers of processed rice foods, steamed rice is mostly used.

As noted above, the preparation of Sushi rice involves the requirement for a particular skill for a delicate manual handling and/or a particular keen sense which one can gain only after experiences for a long period of time. However, a limitation is applied to the number of available skilled Sushi cooks, and today in newly opening Sushi shop or expanding an existing Sushi shop, it is first of all difficult to secure the necessary hands. In the circumstances, it has been strongly demanded in the business fields of Sushi shops and other suppliers of processed rice foods as well that there may be an apparatus provided, by which the vinegaring of boiled rice or the preparation of Sushi rice can be carried out easily and rapidly, without the need for a skilled cook having a long-term experience in such processing of boiled rice.

As already pointed out, to automatically prepare Sushi rice, it is necessary to provide an appropriate mixing apparatus by which operations for the preparation of Sushi rice (mixing and/or stirring operations) can be worked within a short period of time without causing boiled rice to become a dumpling or doughboy or allowing grains of boiled rice to become crushed. However, a desirable apparatus for such an automatic preparation of Sushi rice has not yet been provided.

Mixing devices in general comprise a fixed main body provided therein with rotatable mixing means such as a mixing blade or blades. In a test, soft rice hot from boiling or steaming was put into such an existing mixing device together with an additive or a vinegaring mix and an attempt was then made to operate a mixer to prepare Sushi rice, when it was found that within a short period of the operation time, the boiled rice became crushed to completely lose its original state of grains and was turned into the form of a Mochi, a Japanese food prepared by pounding boiled rice into a cake. From this result of the test, it is told that an ordinary mixing device cannot be effectively utilized for the preparation of Sushi rice and that for the Sushi rice preparation, it is required to provide a particular apparatus by or in which the necessary mixing can take place without permitting boiled rice to be subjected to a large force application.

Prior to the making of the present invention, the inventor of the present invention developed devices by which two or more kinds of material such as livestock feeds can be mixed together within a short period of time without greatly changing original shapes of the materials, and proposed those devices in Japanese Patent Publications Nos. 62-57371 and 62-57372.

The above device pertaining to the present inventor's earlier inventions comprise a cylindrical rotatable container elongate in the direction of axis of rotation, which is provided at one of its longitudinal ends with an inlet and outlet opening for the materials. In one of two embodiments of the devices, two or more partition plates are mounted in the rotating container at an inclination to the axis of rotation of the container, while in the other embodiment, the partition plates are supported in an end staggered arrangement such that the end of one plate lies outward or inward of the corresponding end of another plate near each end of the cylindrical container in the direction of axis of rotation.

Taking into account the technical contents of such earlier inventions and a number of technical discoveries made during the making of the inventions, the present inventor has conducted a variety of experiments so as to effectively apply the acquired techniques to the vinegaring of boiled rice or the preparation of Sushi rice, namely an operation for the addition and mixing of a vinegar-based additive to and in rice hot from boiling, and as a result of the confirmation then obtained that the above described mixing devices according to the inventor's earlier inventions can be effectively applied to the vinegaring of boiled rice, arrived at the present invention.

SUMMARY OF THE INVENTION

Therefore, a primary object of the present invention is to provide an apparatus by which vinegaring of boiled rice, namely preparation of Sushi rice, can be easily made even by a person without a particular skill, without the risk of destroying original grain shapes of the boiled rice and by which an additive or a vinegaring mix mainly comprising a vinegar and containing such as sugar, salt and a natural or chemical seasoning can be homogeneously mixed in the boiled rice and coated on surfaces of grains of the rice.

It is also an object of the present invention to provide an apparatus for processing granular foodstuffs by which a liquid-type or granule- or other particle-type additive can be automatically homogeneously coated on surfaces of grains of boiled rice or other granular foodstuffs which resemble the rice gains in shape and/or nature, while their original shapes are maintained substantially unchanged.

It is a further object of the invention to provide an apparatus which is of a size or volume which is suitable for preparing Sushi rice in an amount which is suitable for placement in a Sushi rice pail which is normally used in Sushi restaurants.

It is a further object of the invention to provide an apparatus which, after preparation of Sushi rice therein, can be suitably placed at a site for hand-shaping of the Sushi rice, without further transfer into separate or additional containers.

The apparatus for processing a granular foodstuff for attaining the above objects according to the present invention comprises a rotatable container provided at its one end or in its body portion with an opening closable with a lid, the container being rotatable about a lateral axis of rotation, an air-blowing fan having a discharge opening disposed at an end of the rotatable container for supplying cooling air into the container, and a partition plate mounted to laterally extend inside the rotatable container.

The apparatus having the above structure, it may be operated to charge a material to be processed comprising appropriate proportions of boiled rice hot from boiling or soon after boiling and an additive mainly comprising a vinegar, namely a vinegaring mix, into the rotatable container through the opening, namely a charging and discharging opening for the materials, then close the opening with the lid, drive the container to rotate about its lateral or horizontal axis of rotation, and while the material undergoes mixing as it is received on the partition plate and then drops off the plate, send cooling air into and out of the container through a ventilation opening of the container to thereby effect a cooling of the material or the boiled rice, whereby preparation of Sushi rice can be completed at a high operation efficiency.

Preferably, the rotatable container comprises a cylinder, and it is provided at its longitudinal one end with an opening, which is utilized as opening for charging a material to be processed and discharging the processed material and which can be closed with a lid formed in its central portion with a hole, which is utilized as ventilation opening, facing which an air discharging opening of an air-blowing fan is disposed so that cooling air can be supplied into the rotatable container to cool the material charged in the container while it undergoes mixing, and then the air can be discharged out of the container.

It is also possible to provide the charging and discharging opening from the material not at a lateral or longitudinal end of the container but in a body portion of the container, and provide a lid to openably close the opening.

Although the rotatable container may be of any of a variety of cross-sectional shapes, generally containers of a cylindrical cross-section are suitably useful in that they are relatively easy to manufacture, easy to close with a lid and easy to clean the inside.

According to the invention, it is required that the rotatable container is rotated not about a vertical axis but a lateral or horizontal axis of rotation and that the partition plate mounted inside the container can mix the soft material to be processed such as boiled rice without the danger of destroying the grain or particle condition of the rice or the material. Apparatus having two or more partition plates mounted therein at an inclination to the axis of rotation of the container is particularly suitable in that mixing of the material and motion thereof towards left or right can easily take place in the container. Although it is most expedient to slantly arrange the partition plates as above, it alternatively is possible to mount the plates parallel to the axis of rotation of the container. Also, it is possible to arrange two or more partition plates parallel to one another or to arrange the ends of the plates to be staggered or offset relative to one another in the direction of the axis of rotation of the container.

Further, although the two or more partition plates are normally parallel arranged relative to one another as above, it is alternatively possible to mount those plates in positions in which they extend in lateral directions but not in a mutually parallel relationship.

As described above, the apparatus of the invention is mainly directed in its function to the preparation of Sushi rice which comes under a mixture together of boiled rice hot from boiling and an additive mainly comprising a vinegar. However, now that it can effect stirring and mixing of soft granular or particulate material resembling the boiled rice without destroying or impairing their shapes in a cooling atmosphere, the apparatus of the invention is effectively useful also as apparatus for processing such material and foodstuffs other than boiled rice which comprise soft grains, granules or particles including those which have a longer and a shorter axes and/or which may comprise a solid body or a hollow body.

DESCRIPTION OF THE PREFERRED EMBODIMENTS

Figure 1:
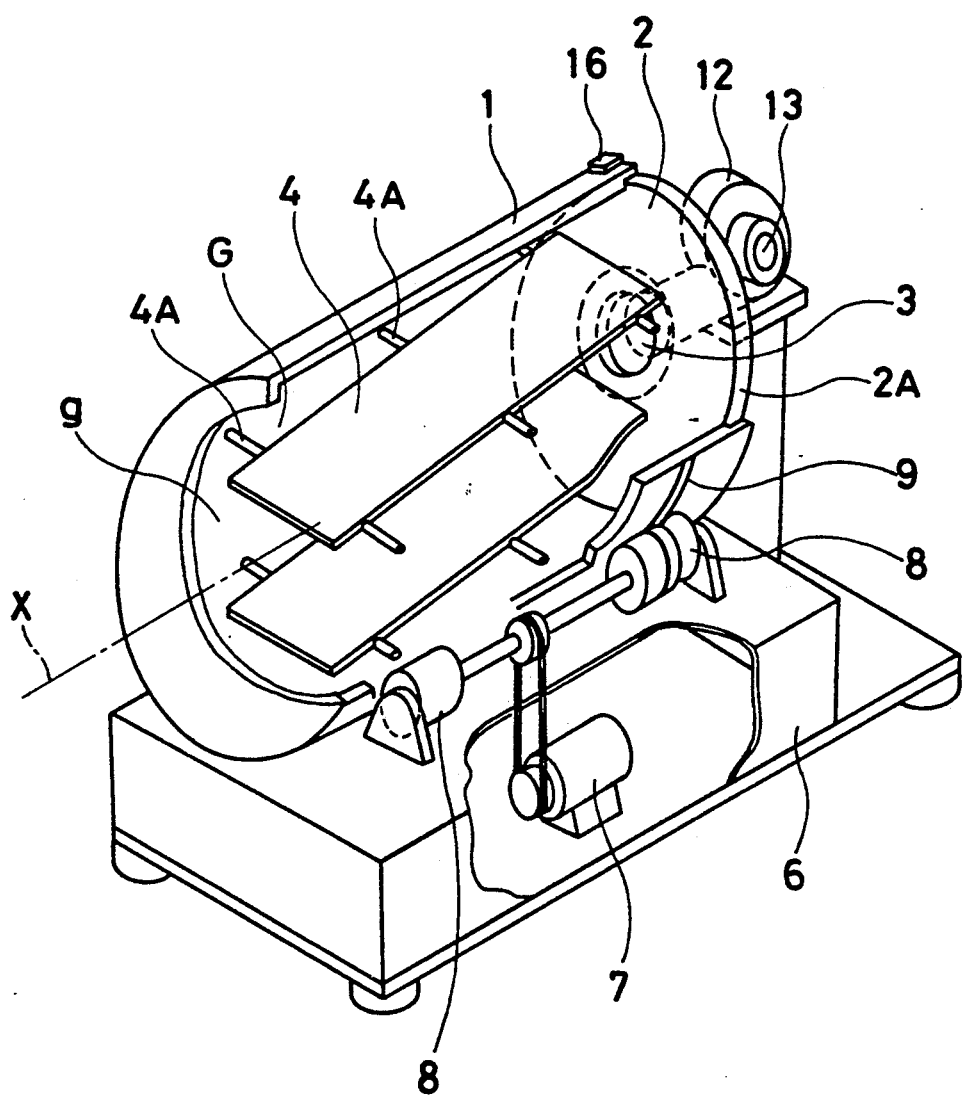
FIG. 1 is a partly broken-away perspective view, showing an apparatus for the preparation of Sushi rice or a like foodstuff, embodying the present invention.

The apparatus according to the invention can be effectively utilized not only for the preparation of Sushi rice but also for a similar processing of various other foodstuffs comprising grains, granules or particles, as before stated. However, for a simplicity of the description and illustration, in the following the invention will be described only in connection with the case of preparation of Sushi rice or vinegaring of boiled rice.

The apparatus of the invention is for adding and mixing a liquid additive to and in boiled rice which is still hot soon after boiling. In a first embodiment of the apparatus according to the invention, illustrated in FIG. 1 through FIG. 4, a rotatable container of a cylindrical configuration is formed with an opening 2 for charging a material to be processed and discharging the processed material, at either of the lateral or longitudinal ends thereof, for example at the right-hand end thereof in FIGS. 1 to 4, and this opening 2 is openably closed with a lid 2A comprising a disk, through a central portion of which a ventilation hole or opening 3 is formed, through which cooling air is blown into the container 1 by an adjacently disposed air-blowing fan 12. After it has cooled the charged material inside of the container, the air is permitted to come out of the container through the above ventilation hole 3.

Within the rotatable container 1, there are mounted two partition plates 4, which are disposed parallel to each other and arranged at an inclination to an axis of rotation X of the container 1. The partition plate 4 comes under a kind of stirring means, and while it may be provided in a number of only one or two or more, in each of the illustrated embodiments of the invention, two partition plates 4 and 4 are provided. In the present first embodiment, two plates 4 and 4 of a same length are secured in a mutually parallel arrangement to their respective support members 4A having an end portion protruding beyond the corresponding side end of the plate 4, as show in FIG. 1. Also as show in FIG. 1, between each longitudinal end of the plate 4 and the inner wall surface at the corresponding end of the container 1, a gap g is maintained, and between each side edge of the plate 4 and the inner wall surface along the corresponding side of the container, a gap G is maintained.

In the present embodiment, the longitudinal ends of one partition plate 4 are aligned or registered with the corresponding ends of the other partition plate 4. Alternative to this, it is possible to arrange the ends of one partition plate staggered or offset from the corresponding ends of the other plate in the direction of the axis of rotation X so that while one of the two ends of one plate 4 is located relatively close to one end face of the container, the corresponding end of the other plate 4 is located relatively close to the other end face of the container.

A main body or a body portion of the apparatus which is composed of the rotatable container 1 of the lid 2A formed with the opening 2 for charging or discharging of the material may be made of any of a synthetic resin, a metal, a reinforced glass and wood, the inner wall surface of the body portion that undergoes contact with the material to be processed comprising boiled rice 14 and a vinegar-based additive may be coated or laminated with a tetrafluoro ethylene resin (commercially obtainable under the registered trade name of Teflon, at E. I. du Pont de Nemours & Co., Inc., U.S.A.)

Externally, the body portion comprises the rotatable container 1 and the disk-type lid 2A may be covered with a thermal insulator as needs be and may be further applied with a surface covering of a metallic material or a synthetic resin material so that this body portion of the apparatus can be utilized as a warm keeping container after the completion of the vinegaring of boiled rice.

The rotatable container 1 is supported on a base stand 6 through two or four bearing rollers 8 to be rotated by a motor 7, and it is rotated about the horizontal axis of rotation X. To prevent the container from moving in the direction of the rotation axis X while it is rotated, the container is provided with a guide portion 9, which comprises a ring of a ridge or groove extending over a whole of the outer circumference of the container 1, and a compensatory guide portion 10 is provided on the bearing rollers 8, comprising a ring of a groove or ridge engageable with the guide portion 9.

By way of an example of practical dimensional specifications of the apparatus of the above described first embodiment of the invention, the rotation container 1 has a diameter and a length of 400 mm, the ventilation opening 3 formed in the disk-shaped lid 2A has a diameter of 110 mm, and the discharge opening of the air-blowing fan 12 has a diameter d (FIG. 5) of 50 mm.

Figure 2:
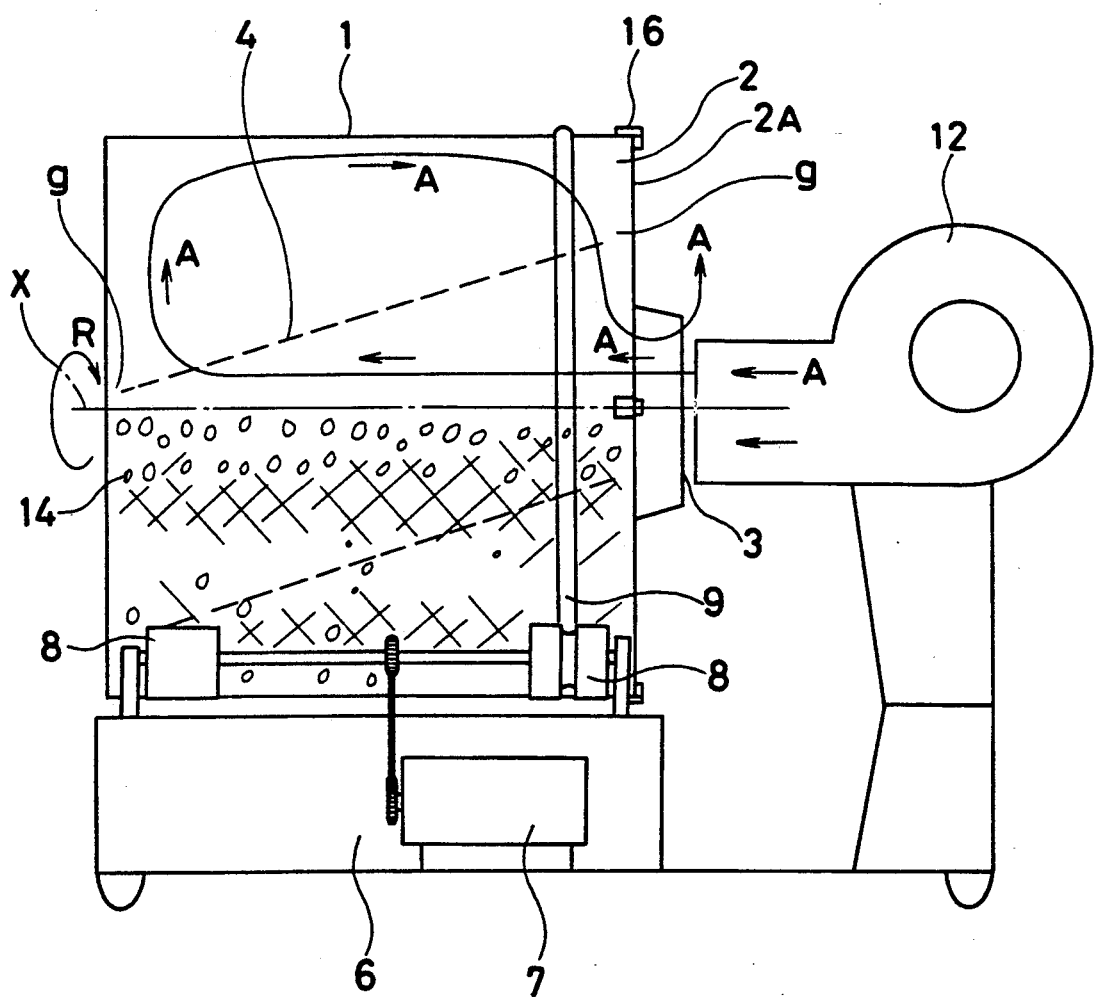
FIG. 2 shows a side elevation of the apparatus of FIG. 1, taken for illustration of the condition of mixing taking place in a rotatable container of the apparatus.
Figure 5:
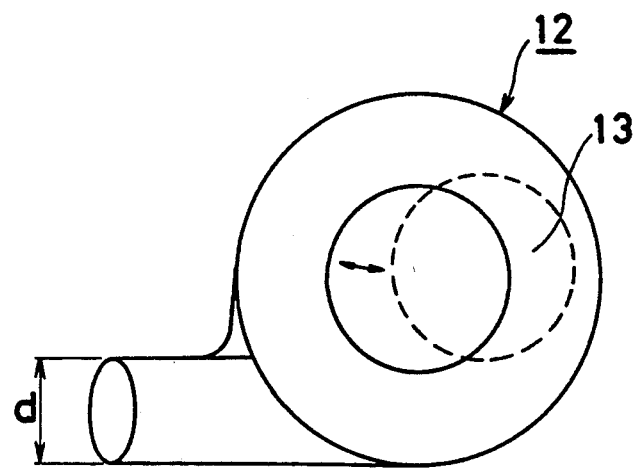
FIG. 5 shows a side elevation of an air-blowing fan.

The above described apparatus employs such an airflow reversing system in which air is caused to flow as shown by arrows A in FIG. 2 so that flowing of air into the container and flowing of air out of the container take place through a same opening, namely the ventilation opening 3. This opening has a tapered configuration such that its bore size is smallest at the external end of the opening and is enlarged at the internal end of the opening. As a result of this, the material charged in the container 1 can be prevented from being sent out of the container. Further, the air-blowing fan 12 shown in FIG. 5 is provided with a damper 13 so that the rate of blowing of air can be adjusted.

Using the above described apparatus, vinegaring of boiled rice or the preparation of Sushi rice may be carried out according to the following described steps (a) and (b).

(a) Material Feeding Step

Figure 6A:
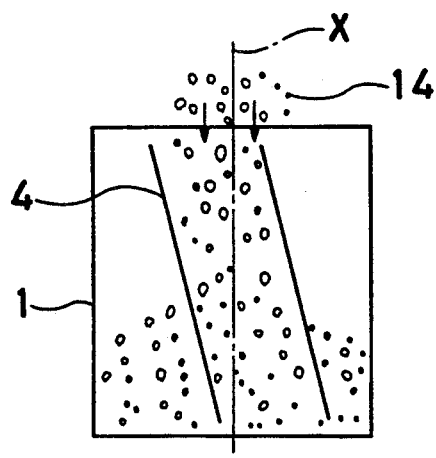
FIG. 6 shows a sectional side view, illustrating the condition in which the rotatable container is brought into an erect position and charging of a material to be processed is being carried out.
FIG. 6B is a cross-sectional view of FIG. 6A.
Figure 6B:
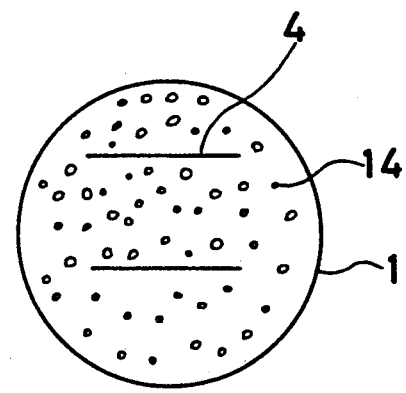
Figure 7A:
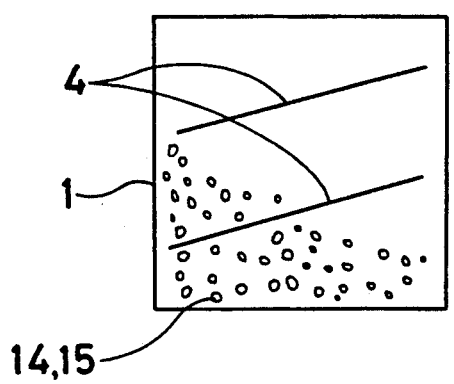
FIGS. 7A and 8A are sectional side views, showing the operation condition in which the rotatable container into which the material was charged in the condition shown in FIG. 6A is now brought into a horizontal position as shown in FIGS. 1 and 2 and is put into rotation.
Figure 7B:
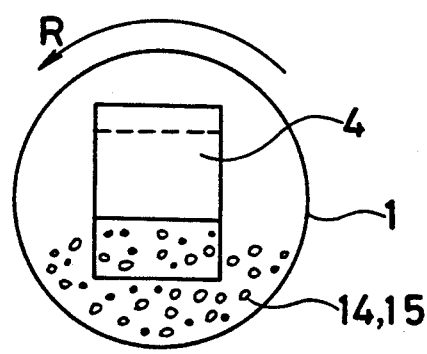
FIG. 7B is a cross-sectional view of FIG. 7A.
Figure 8A:
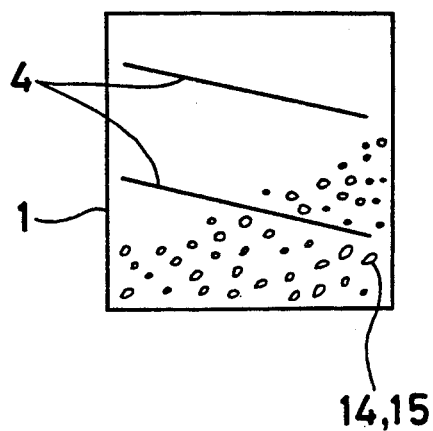
Figure 8B:
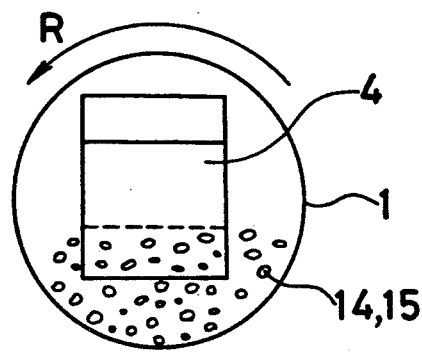
FIG. 8B is a cross-sectional view of FIG. 8A.
Figure 9A:
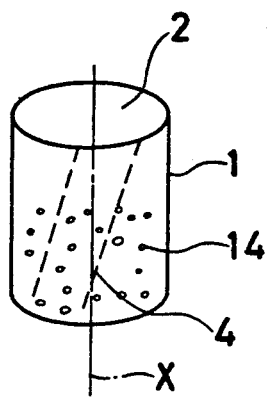
FIG. 9A through FIG. 9E are perspective views, showing in combination the operation steps for the preparation of Sushi rice carried out by the apparatus shown in FIGS. 1 and 2.

In the condition shown in FIG. 9A in which the axis of rotation X of the rotatable container 1 is fixed in a vertical position, the disk-type lid 2A openably closing the charging and discharging opening 2 may be opened, and through the opening 2, boiled rice 14 which is immediately after boiling and is still very hot may be rapidly charged into the rotatable container 1 in a manner as shown in FIGS. 6A and 6B. The feed amount of the rice 14 should be such that when the container 1 is rotated after charging of the boiled rice 4, the rice 14 does not come out of the container.

Figure 9B:
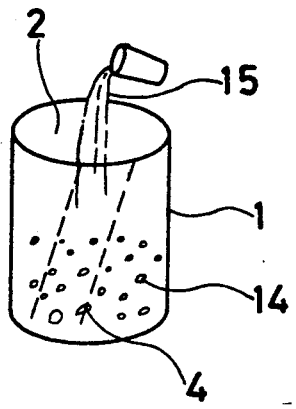

Thereafter, an additive or a vinegaring mix 15 mainly comprising a vinegar and containing such as sugar, salt and a natural or a chemical seasoning is applied over the rice 14 as shown in FIG. 9B, in an amount in an appropriate proportion to the amount of the charged rice 14.

Figure 9C:
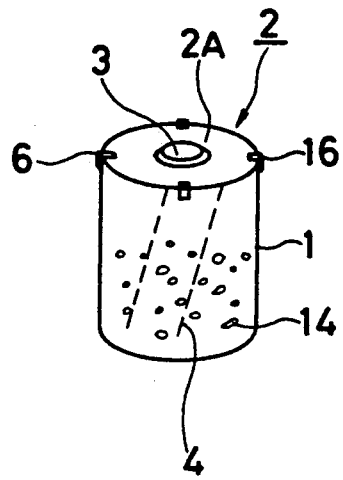

Then, as shown in FIG. 9C, the lid 2A is applied to cover the opening 2 and fixed in position by means of fixing metals 16, whereby the step for feeding the material into the container 1 is completed.

(b) Cooling/Mixing Step

Figure 9D:
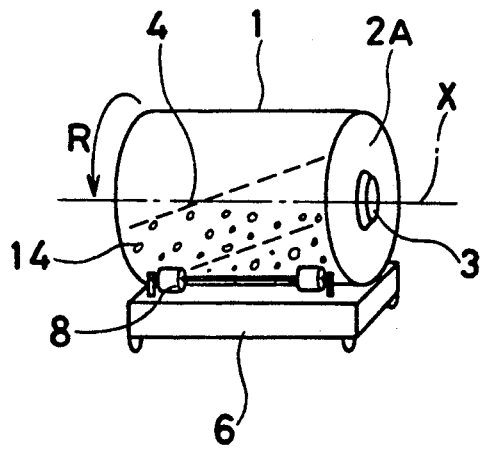

The rotatable container is charged with the material will then be placed in the prescribed horizontal position on the two or four bearing rollers 6 secured on the base stand 6 as shown in FIG. 9D, and will be rotated in the direction shown by an arrow R at a number of rotation of 5 to 10 rpm for 2 to 3 minutes.

During the rotation of the container 1, a shown in FIGS. 7A, 7B, 8A and 8B, the material within the container 1 is repeatedly moved up and down, the movement of the material including sliding motions, and subjected to an effect of mixing by the partition plates 4 mounted at an inclination relative to the axis of rotation X and with gaps G and g maintained between the side edges and the end edges thereof on the on hand and the inner wall surfaces of the container 1 on the other, whereby the boiled rice 14 and the additive 15 becomes mixed together to attain vinegaring of the boiled rice.

An important characteristic of the present invention resides in the arrangement in which during the step of mixing the boiled rice 14 and the additive 15 together, a step is taken to supply air to effect cooling.

Figure 9E:
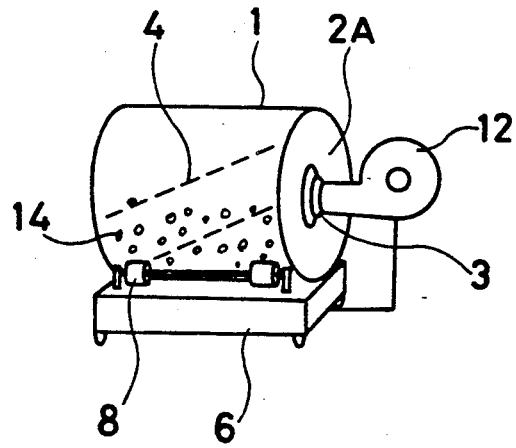

As shown in FIG. 9E, while the vinegaring mix or additive 15 is added to and mixed in the boiled rice 14 hot from boiling, air is blown into the container 1 by the air-blowing fan 12 to cool the rice 14 to an appropriate temperature so that after it is processed, the boiled rice can have a savor and glossiness each of which is attractive.

The air blown out from the fan 12 enters the container 1 through the ventilation hole 3 as shown by arrows A in FIG. 2, flows in a diffused condition in contact with grains of the rice 14 to cool the latter, then reverses direction of its flow and eventually comes out of the same ventilation hole 3 as above. That is to say, according to the present invention, an air-flow reversing is employed in which the flow of air into the container and its flow out of the container are carried out at the same time through the single ventilation hole 3 formed in a central portion of the disk-type lid 2A.

The vinegared boiled rice or Sushi rice prepared by the above steps can be easily taken out of the container 1 by opening the disk-like lid 2A to open the material charging and discharging opening 2.

As described above, in the apparatus according to the invention, when the container 1 is rotated, the material is imparted with the effect of riding on the partition plates 4, sliding on the plates 4 and upsetting its position, repeatedly. Therefore, in contrast to the cases of ordinary mixing devices, in the case of the apparatus according to the invention mixing of the material takes place without any large force applied to the material, and the material repeats upsetting and rolling. Further, during such mixing of the material, air is supplied into the container 1 by the air-blowing fan 12, so that a sufficient amount of air can be supplied to grains of the rice while they are kept moving, including upsetting motions, rolling motions and sliding motions within the container. Therefore, the material can be cooled to an optimal temperature and, at the same time as this, become imparted with an appropriate degree of moisture.

Now, the series of steps for the preparation of Sushi rice using the apparatus of the present invention may be compared with the ordinarily operated steps. In ordinary methods of preparation of Sushi rice, fresh boiled rice which is very hot soon after boiling is placed in a mixing pail of a relatively small depth, and in adding the additive mainly comprising a vinegar to the boiled rice in the mixing pail, rice scoop held by either hand is handled to quickly upset the rice in portions to effect mixing of the additive with the rice, and at the same time as this, a hand fan held by the other hand is also quickly operated to send a great amount of air to the hot rice. The above manual operations require not only a considerable amount of labor but also a particular experienced skill to carry out an even upsetting of rice grains and an even effect of mixing of the rice and the additive together.

Using the apparatus according to the invention, the above mixing operation and the cooling operation to be made during the mixing operation can be carried out at the same time and automatically.

Figure 10:
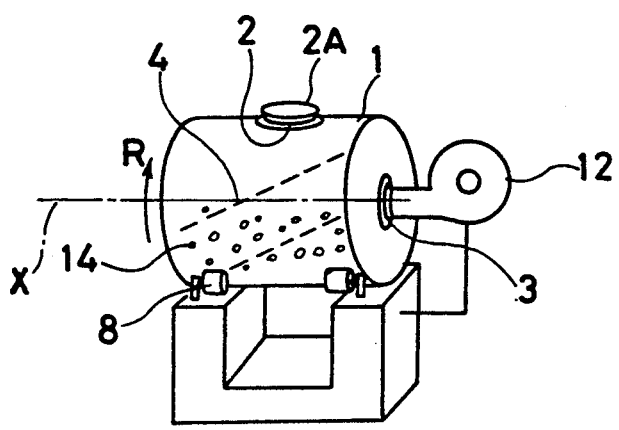
FIG. 10 is a perspective view, showing apparatus according to a second embodiment of the invention.

Now, entering a description into the second embodiment of the invention illustrated in FIG. 10, the basic structure and arrangement of and in the apparatus of the present embodiment have almost same structural features and operational feature as the above considered first embodiment, and same parts and elements in respective embodiments are indicated by same reference numerals and characters.

The rotatable container 1 of which FIG. 10 shows a perspective view is driven to rotate as it is supported also in a horizontal position, but in the present embodiment, the material charging and discharging opening 2 having the disk-type lid 2A to openably close the opening is provided not at an end but in a body portion of the container 1. Same as the above described first embodiment, the ventilation hole or opening 3 is provided in a central portion at one end of the container 1.

In operation, the material to be processed, which comprises the boiled rice 14 and the additive 15, is charged into the container 1 in the condition in which the material charging and discharging opening 2 is brought at a top position. After charging of the material, the container 1 may be rotated in the direction as indicated by an arrow R, when the material slides along two partition plates 4 disposed at an inclination to the axis of rotation X of the container and moves first towards the left side in FIG. 10. Then, as the container 1 is further rotated, the material moves in the circumferential direction of the container 1, and as the direction of inclination of the partition plates 4 are then reversed, it slides along the plates to collect at the right side in FIG. 10 while it moves in the circumferential direction.

As described above, as the container 1 is rotated, the material charged in the container repeats motions towards left or right along the axis of rotation X, motions in the circumferential direction of the container and motions towards up and down, whereby a sufficient effect of mixing of the material is attained, when the material charging and discharging opening 3 may be brought to and set at a bottom position, and the lid 2A may be opened to discharge the processed rice towards below out of the container 1.

The above-described structure and arrangement according to the second embodiment of the invention is expediently applicable particularly to an apparatus having a container 1 having a relatively large length in the direction of the axis of rotation X for the preparation of a relatively large amount of Sushi rice through a single operation cycle.

Figure 11A:
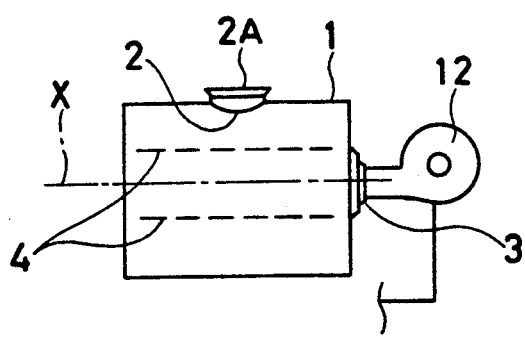
FIG. 11A is a schematic side elevation, showing essential portions of apparatus according to a third embodiment of the invention.
Figure 11B:
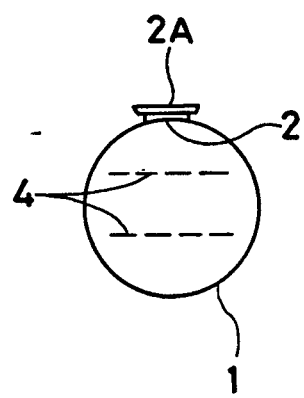
FIG. 11B shows a front view of FIG. 11A.

Then, in the third embodiment of the invention shown in FIGS. 11A and 11B, two partition plates 4 mounted in the rotatable container 1 are arranged parallel to the axis of rotation X and with space from the inner peripheral surface of the container 1. In comparison with the cases of the before described first and second embodiments in which the partition plates 4 are arranged at an inclination to the axis of rotation X, both the mounting of the plates 4 and the cleaning of the interior of the container 1 can be more easily made according to the present third embodiment.

Further, same as in the above first embodiment, in the present embodiment, too, gaps are maintained between the periphery of the partition plates 4 and the inner wall surfaces of the container 1 so that the material can be prevented from collecting in any one location within the container 1.

Figure 12:
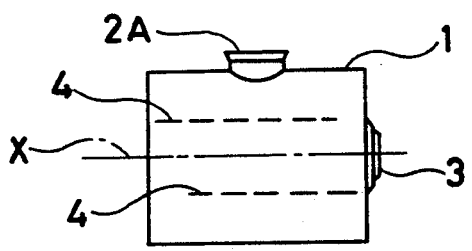
FIGS. 12 and 13 are side elevational views, showing an apparatus according to a fourth and a fifth embodiment of the invention, respectively.

FIG. 12 shows a fourth embodiment of the invention, and in the apparatus according to the present invention, the ends of one of two partition plate 4 and the corresponding ends of the other partition plate 4 in the direction of the axis of rotation X are disposed in a staggered arrangement or are offset from one another. According to this arrangement of the partition plates 4, even in the case in which two partition plates 4 are disposed parallel to the axis of rotation X, a sufficient effect of mixing of the material can be attained in that the material can repeat movements in the direction of the axis of rotation X and movements in the circumferential direction of the container 1 and also in that a portion of the material tending to attach on the inner wall surface of the container 1 can be permitted to fall down as it is moved to an upper position within the container, this movement of the material also taking place in repetition.

Figure 3:
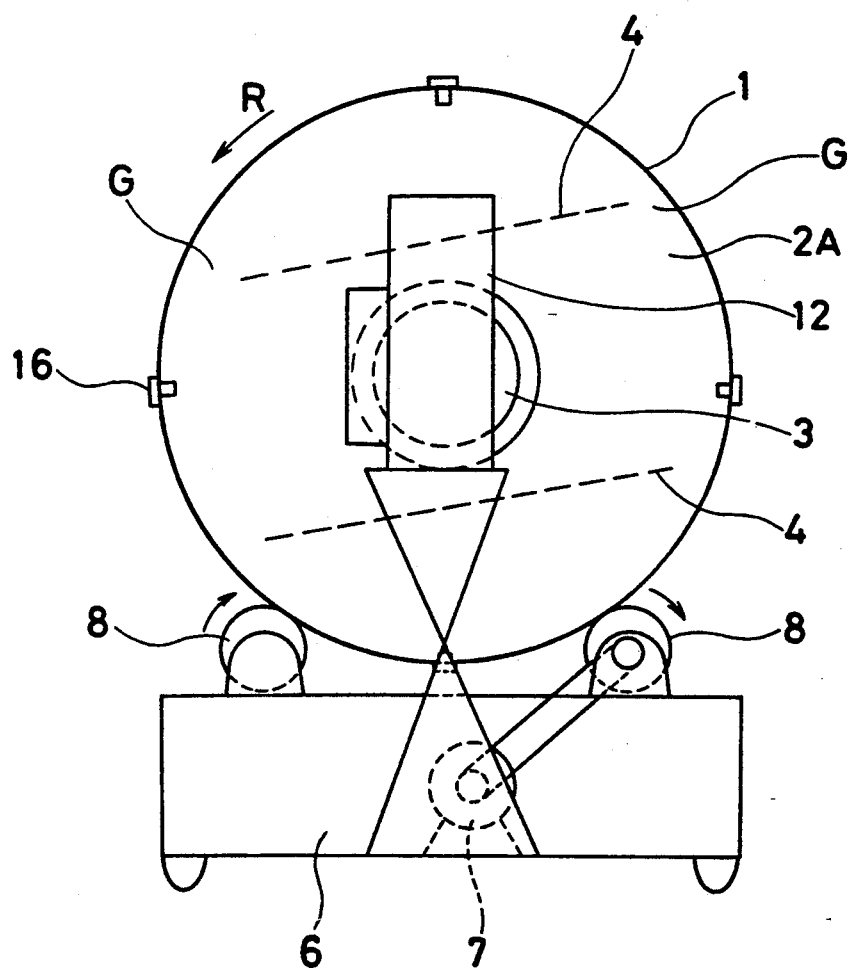
FIG. 3 shows a front view of FIG. 2.
Figure 4:
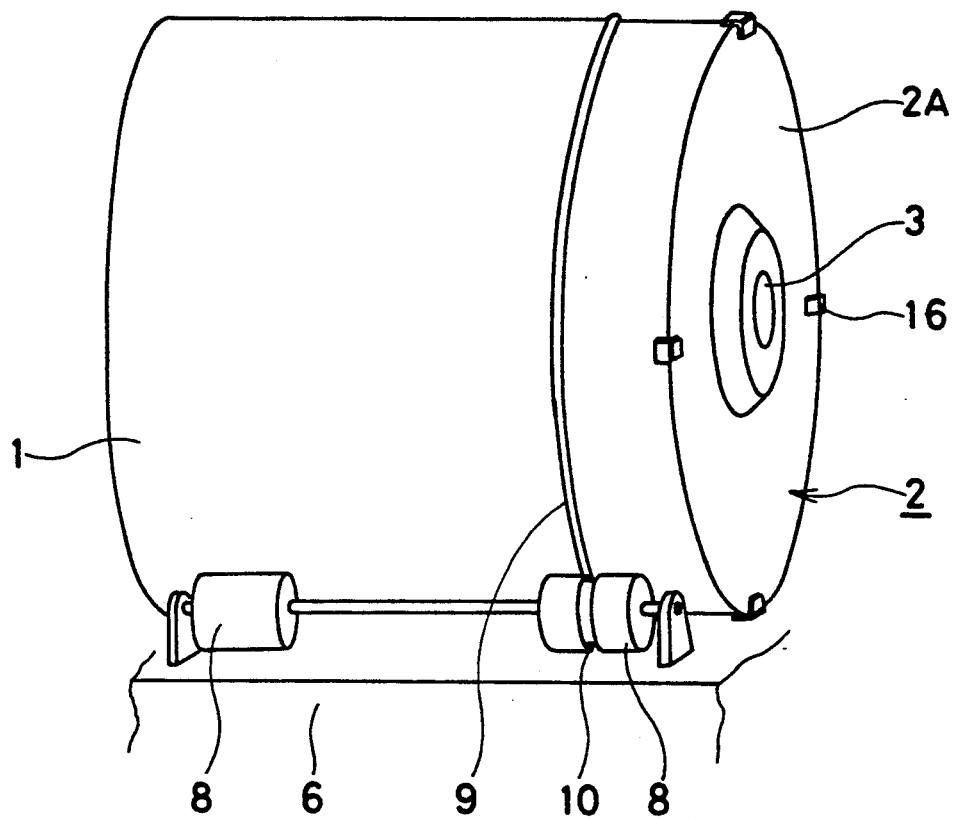
FIG. 4 is a perspective view, showing the rotatable container and a driving mechanism for the container.
Figure 13:
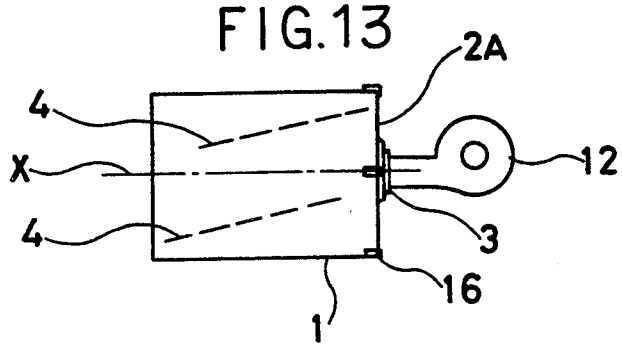

In a fifth embodiment of the invention, which is illustrated in FIG. 13, two parallel arranged partition plates 4 are mounted at an inclination to the axis of rotation X, same as in the first embodiment illustrated in FIGS. 1 to 3. However, in the present embodiment, the two plates 4 are in an end-staggered arrangement. That is to say, ends of one of the two plates 4 are offset from the corresponding ends of the other plate 4 in the direction of the axis of rotation X, same as in the above fourth embodiment shown in FIG. 12. According to this arrangement, too, a same sufficient effect of mixing as obtained in the first embodiment can be obtained.

Figure 14A:
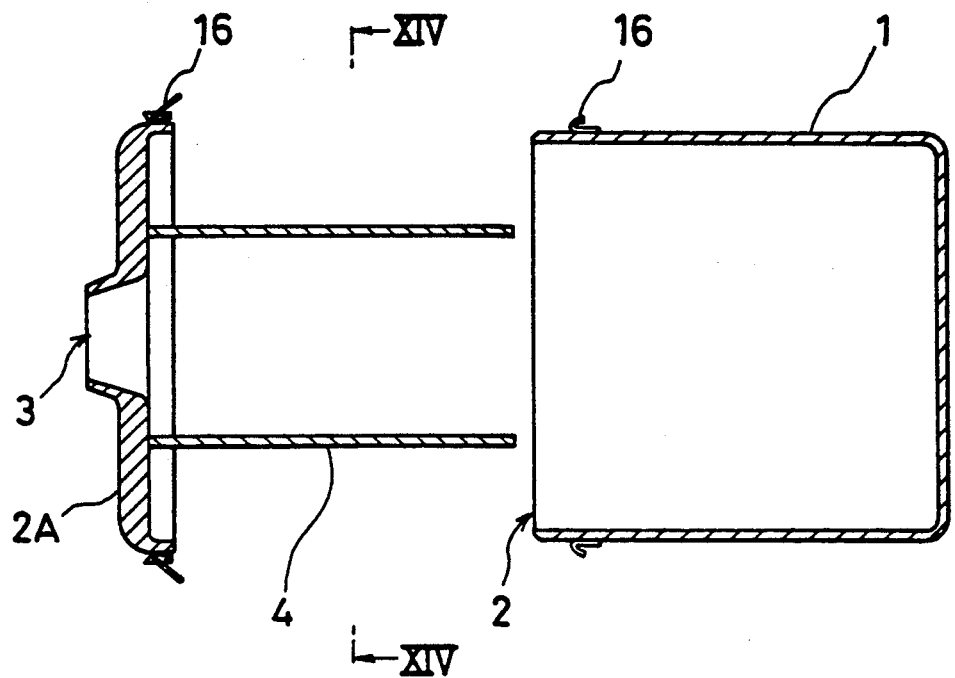
FIG. 14A is a sectional view, showing the rotatable container and the disc-shaped lid in a dismounted condition, according to a sixth embodiment of the invention.
Figure 14B:
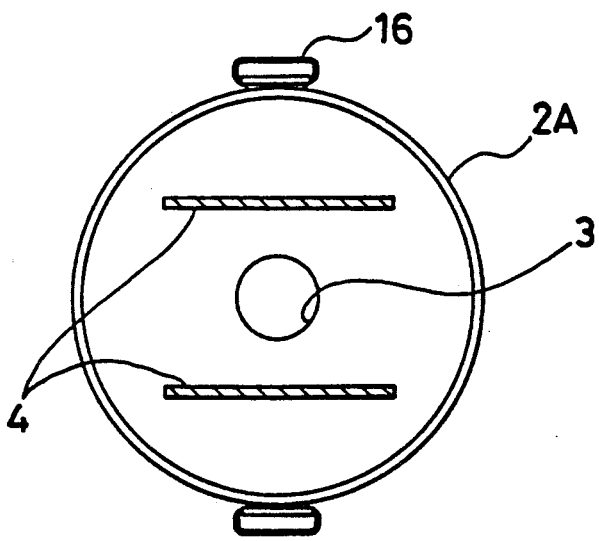
FIG. 14B shows a sectional view, taken along line XIV—XIV in FIG. 14A.

FIGS. 14A and 14B in combination illustrate the apparatus according to the sixth embodiment of the invention, which is structured same as the apparatus according to the foregoing described embodiments, except that the partition plates 4 are fixed to the disk-shaped lid 2A, which do not touch the inner wall of the rotatable container 1, at all. Thus, the apparatus of the present sixth embodiment is characterized particularly in that when the disk-shaped lid 2A is disengaged from the rotatable container 1, the partition plates 4 can be removed out of the container 1 together with the lid 2A, whereby an advantage can be brought about such that the need for once transferring the prepared Sushi rice in the container 1 into a separate Sushi rice pail is effectively cancelled, and the container 1 containing the prepared Sushi rice can be intact carried onto a Sushi cook's table or to a site or the vicinity of a site at which the hand-shaping or hand-rolling of Sushi rice is operated.

Figure 15:
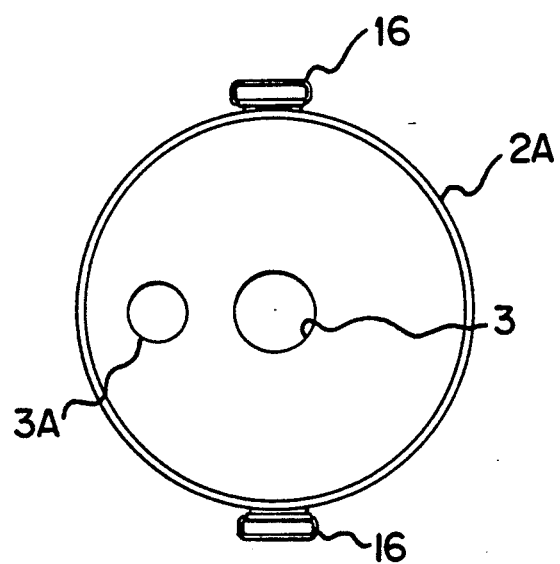
FIG. 15 shows the lid of the rotatable container having a separate air inlet and outlet.

Although in the illustrated embodiment the lid 2A is formed with a single ventilation hole 3, through which supply and evacuation of air take place, it is otherwise possible as illustrated in FIG. 15 to provide a hole 3 for supply of air at a radially central portion of the lid 3A and another hole for evacuation at a portion of the lid spaced from the axis of rotation of the container 1.

Further, in the above description of first to sixth embodiments of the invention, two or more partition plates 4 are described in each instance to be so arranged as to form mutually parallel planes.

However, it is not always necessary that the plurality of partition plates 4 are arranged to form mutually parallel planes, and alternative to this, they may be mounted to form planes in an A or V arrangement or form planes cross each other at a right angle. Also, the shape of the partition plates 4 is not necessarily limited to the flat surface-forming shape as in each of the above described embodiments, but the plates 4 may otherwise have a waved shape or have a grid structure.

Furthermore, while in each of the described specific embodiments the rotatable container 1 comprises a cylindrical one, this is only by way of an example, and insofar as it comprises a rotatable container, the container 1 may of course be of any other cross-sectional shape, for example it may have a polygonal shape such as a square or rectangular shape, pentagonal shape and so forth in cross-section.

The above described apparatus for the preparation of Sushi rice or for processing granular foodstuffs according to the present invention can bring about the advantage that without the need for a skilled hand, an additive can be added to and mixed in hot boiled rice without the danger of destroying grains of the rice while an effect of cooling is imparted to the hot rice, whereby it is possible to easily and rapidly prepare Sushi rice having attractive glossiness and savor.

Particularly, when the apparatus of the invention is used as an apparatus for Sushi rice, boiled rice can be prevented from becoming a dumpling and grains of the rice can be prevented from becoming crushed during the operation steps, and yet an additive mainly comprising a vinegar can be homogeneously mixed in the rice, so that a satisfactory Sushi rice can be easily prepared in a large amount through each operation cycle. Thus, the apparatus of the present invention is highly effective in enhancing the operation efficiency in the preparation of Sushi rice or in the processing of granular foodstuffs.

What is claimed is:

1. An apparatus for preparation of sushi rice, comprising:
    a rotatable container having a horizontal axis of rotation and being in the form of a pail having a cylindrical wall and a closed bottom wall, the container having at an end opposite said closed bottom wall an opening for adding boiled rice and liquid seasoning mix mainly comprising vinegar and for discharging prepared sushi rice out of the rotatable container;

a lid removably secured to the rotatable container to close and open the opening of the container and formed with a ventilation hole comprising a through-hole at a central portion of the lid for supplying cooling air into the container;

at least one partition plate secured to the removable lid, and having a width smaller than an inner diameter of the rotatable container such that when said lid covers said rotatable container said at least one partition plate projects into said container toward said container bottom wall with space maintained between edges of the at least one partition plate and an inner surface of said cylindrical wall of said rotatable container;

a base for rotatably supporting the rotatable container in its horizontal position, the base comprising a means for rotating the rotatable container about its horizontal axis; and a blower for blowing cooling air into the rotatable container through said through-hole of said lid so as to cool the rice therein.

2. An apparatus as claimed in claim 1, wherein there are at least two of said partition plates, said plates being spaced apart.

3. An apparatus as claimed in claim 2, wherein said at least two partition plates are mounted at an inclination to the axis of rotation of the rotatable container.

4. An apparatus as claimed in claim 2, wherein said at least two partition plates are mounted parallel to the axis of rotation of the rotatable container.

5. An apparatus as claimed in claim 2, wherein said at least two partition plates are disposed adjacent said ventilation hole.

6. An apparatus as claimed in claim 1, wherein said means for rotating comprises a plurality of rows of bearing rollers arranged along the axial direction of the rotatable container and bearing the outer surface of the cylindrical wall of the rotatable container, at least one of the rows of rollers being operably connected to a driving device for rotation.

7. An apparatus as claimed in claim 1, wherein said lid further comprises an air evacuation hole in said lid disposed radially outwardly from the air introduction through-hole.

8. An apparatus as claimed in claim 7, wherein the at least one partition plate comprises at least two spaced apart partition plates.

9. An apparatus as claimed in claim 8, wherein said at least two partition plates are mounted at an inclination to the axis of rotation of the rotatable container.

10. An apparatus as claimed in claim 8, wherein said at least two partition plates are mounted parallel to the axis of rotation of the rotatable container.

11. An apparatus as claimed in claim 7, wherein said means for rotating comprises a plurality of rows of bearing rollers arranged along the axial direction of the rotatable container and bearing the outer surface of the cylindrical wall of the rotatable container, at least one of the rows of rollers being operably connected to a driving device for rotation.

12. An apparatus as set forth in claim 7, wherein said rotatable container and lid are removably disposed on said base such that said rotatable container is adaptable for use as a sushi rice holding pail when said rotatable container and lid are removed from said base, and said lid is removed from said rotatable container.

13. An apparatus as claimed in claim 7, further comprising latching means for latching said lid to said rotatable container.

14. An apparatus as claimed in claim 7, wherein said blower comprises a valve for adjusting the flow rate of air into the rotatable container.

15. An apparatus as claimed in claim 7, wherein said cylindrical wall of said rotatable container comprises a smooth cylindrical surface.

16. An apparatus as set forth in claim 1, wherein said rotatable container and lid are removably disposed on said base such that said rotatable container is adaptable for use as a sushi rice holding pail when said rotatable container and lid are removed from said base, and said lid is removed from said rotatable container.

17. An apparatus as claimed in claim 16, further comprising latching means for latching said lid to said rotatable container.

18. An apparatus as claimed in claim 1, wherein said blower comprises a valve for adjusting the flow rate of air into the rotatable container.

19. An apparatus as claimed in claim 1, wherein said cylindrical wall of said rotatable container comprises a smooth cylindrical surface.

20. An apparatus as claimed in claim 1, wherein said blower is disposed so as to supply cooling air into the rotatable container through part of said ventilation hole so as to allow the discharging of air out of a remaining part of said ventilation hole.

* * * * *